May 18, 1943. J. C. CROWLEY 2,319,534
LAMINATED GLASS AND METHOD OF MAKING SAME
Filed Sept. 25, 1939 3 Sheets-Sheet 1
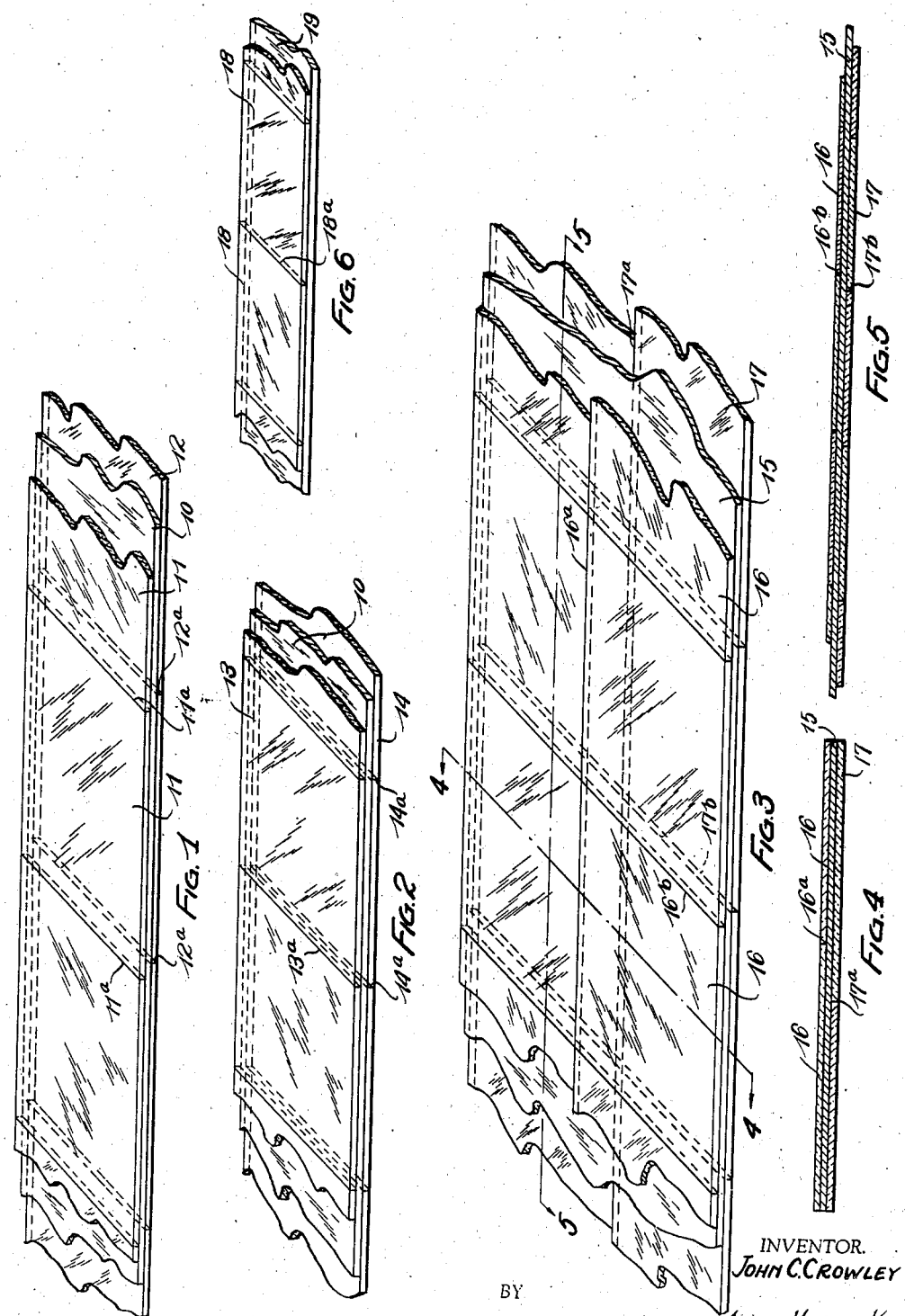
INVENTOR.
JOHN C. CROWLEY May 18, 1943.  J. C. CROWLEY  2,319,534
LAMINATED GLASS AND METHOD OF MAKING SAME
Filed Sept. 25, 1939  3 Sheets-Sheet 2
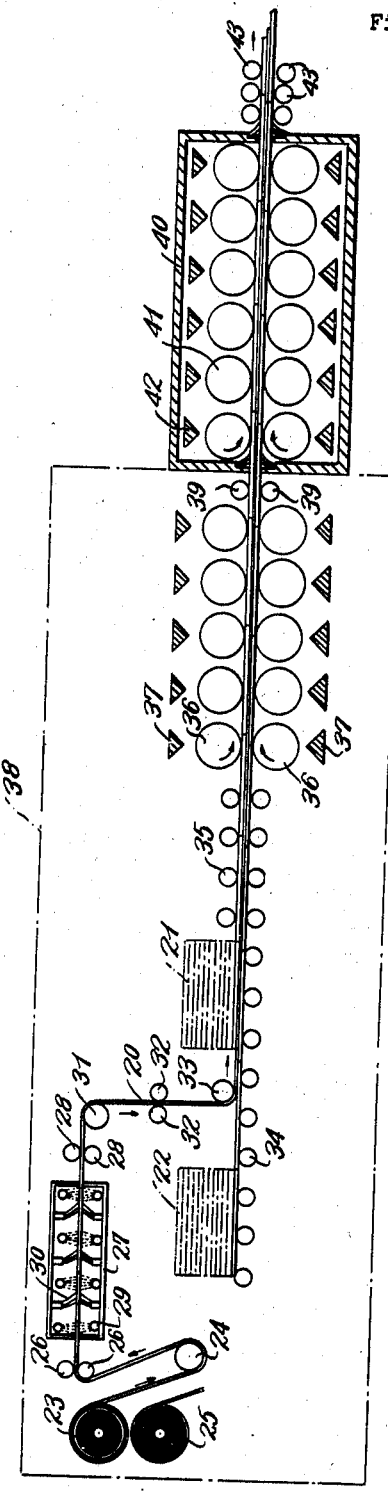
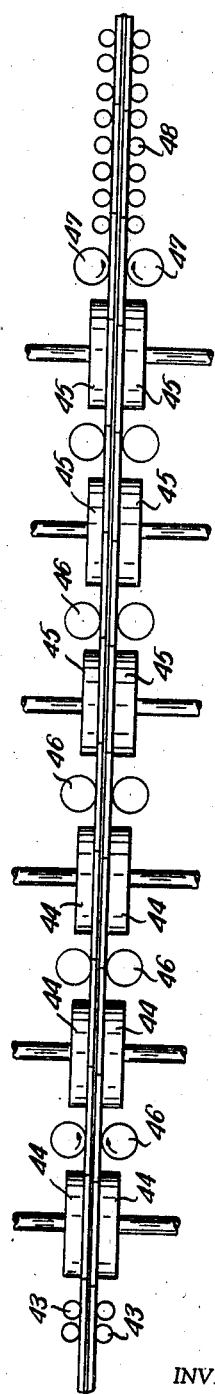
INVENTOR.
JOHN C. CROWLEY
BY
Kwis Hudson & Kent
ATTORNEYS May 18, 1943.  J. C. CROWLEY  2,319,534
LAMINATED GLASS AND METHOD OF MAKING SAME
Filed Sept. 25, 1939  3 Sheets-Sheet 3
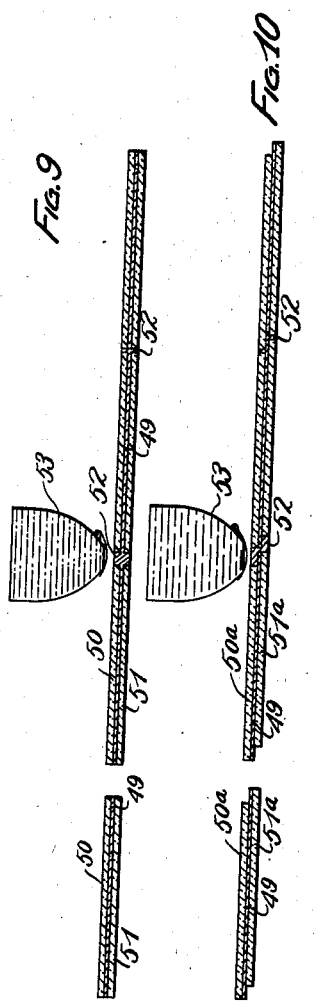
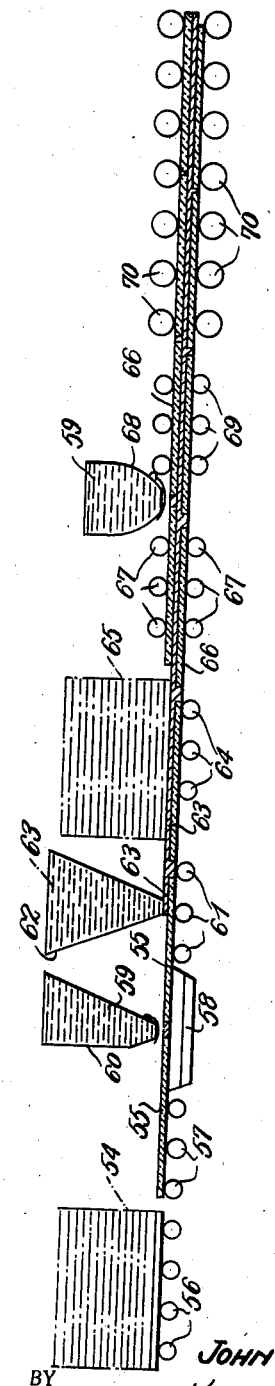
INVENTOR.
JOHN C. CROWLEY
BY
Kwis, Hudson, & Kent
ATTORNEYS Patented May 18, 1943

2,319,534

UNITED STATES PATENT OFFICE 2,319,534

LAMINATED GLASS AND METHOD OF MAKING SAME

John C. Crowley, Cleveland Heights, Ohio

Application September 25, 1939, Serial No. 296,390

8 Claims. (Cl. 154—2.73)

This invention relates to laminated glass and particularly to a strip of laminated glass and the method of forming the same as well as to the method of surfacing the said strip.

The invention contemplates arranging a plurality of series of prefabricated sheets or plates of glass in superimposed relationship with plastic material interposed between the superimposed series of glass plates or sections and acting, under heat and pressure, to bond the plates or sections into an integral structure, after which the outer surfaces of the structure can be surfaced, either as part of a continuous manufacturing process or subsequently by the purchaser of the structure.

The invention further contemplates having the adjacent edges of the plates or sheets of each series arranged in substantially abutting relationship, and in certain aspects of the invention these abutting adjacent edges will be bonded together by suitable bonding material interposed therebetween.

The term "prefabricated" sheets or plates of glass as used herein means glass in sheets, plates or sections which have been cut or severed from a ribbon or strip of glass as produced by glass fabricating equipment, which sheets, sections or plates of glass are unsurfaced on one or both sides thereof.

The plastic material which is interposed between the superimposed series of prefabricated glass plates or sections may be a preformed strip of plastic material, or it may be applied to the plates or sections of glass in a semi-fluid or emulsified condition as the plates or sections are being assembled in superimposed relationship.

The sheets, sections or plates of prefabricated glass when made into the strip or ribbon of laminated or ply glass as contemplated by the present invention will have special utility in the manufacture of automobile windows and windshields, although, of course, there will be many other instances wherein the laminated glass can be usefully used.

In the manufacture of laminated glass such as referred to herein, the usual method followed is to sever sheets, plates or sections of flat glass from the continuous strips produced by the glass fabricating machine or apparatus. The sheets, plates or sections thus severed are then ground on both of their flat surfaces. Thus if the laminated glass to be made therefrom is to consist of two plies of glass, i. e., two superimposed plates, sections or sheets, it is necessary to grind and polish four surfaces, while if the laminated glass is to consist of three plies it will be necessary to grind and polish six surfaces, and a corresponding increase in the number of surfaces to be ground and polished exists with each increase in the number of plies of the laminated glass.

In grinding and polishing the surfaces of the sheets, sections or plates of glass it is necessary to preliminarily prepare the sections or plates of glass in the grinding machine before the same can have the grinding or polishing elements applied thereto. First plaster or other suitable adhesive material must be spread over the grinding table of the grinding machine. Then a sheet or section of glass is laid in this plaster or adhesive material and remains therein until such material sets or hardens, as it is essential that the sheet or section of glass be firmly anchored or otherwise held against displacement or shifting movement during the surfacing operation. When the plate or section of glass has been surfaced on one side it must then be removed from its cast on the grinding table, the table must again be prepared and then the sheet of glass is repositioned thereon with its other side accessible for the surfacing operation, it being necessary to again allow the plaster or adhesive material to harden to anchor the sheet or section of glass.

After the sections or sheets of glass have been surfaced on both sides a prepared sheet or section of suitable plastic or bonding material is placed between superimposed plates or sheets of the polished glass and the assembly is then firmly pressed together and subjected to relatively high pressures and high temperatures to complete the bond between the plies of glass and the plastic material.

The production of laminated glass by the usual method, as just above described and wherein the individual sheets, plates or sections of glass are first ground and polished on both sides and then the individual plates or sections formed into a laminated structure, entails the use of costly grinding equipment and a number of different processing operations resulting in very high costs for the finished product.

The principal object of the present invention is to provide an improved method of manufacturing laminated glass more cheaply, more efficiently and more expeditiously than heretofore, in that, the number of processing operations required are materially reduced, although the quality of the laminated glass is improved.

In addition to the usual method or process employed in the manufacture of laminated glass as hereinbefore referred to, it has been suggested that prepared or surfaced plates, sections or sheets of glass and the interposed plastic bonding material be progressively assembled with the material sandwiched between the prepared or surfaced plates or sections of glass and then the assembled structure advanced through the pressing and heating apparatus. In this suggested method or process intervals or spaces are provided between the superimposed plates or sections of glass of one assembled unit and those of the adjacent assembled units, the interposed bonding or plastic material, however, being in the form of a continuous ribbon or strip. In this suggested method or process, as just referred to, there is no stability between the different units of superimposed plates or sections of glass, since they are not interconnected except for the interposed ribbon or strip of plastic material, and consequently the sections or plates of glass could not be ground and polished after being arranged in the superimposed relationship, but must be prepared and surfaced prior to such arrangement.

Another object of the present invention is to provide a method of forming prefabricated sheets, sections or plates of glass into a strip or ribbon of laminated glass in the form of an integrated structure and wherein the outer surfaces of the laminated strip or ribbon of glass can be surfaced, either as part of a continuous manufacturing process or subsequently by the purchaser of the strip, thus assuring perfect parallelism between the outer surfaces of the finished strip.

A further object is to provide a method of manufacturing a strip or ribbon of laminated glass from prefabricated sections, plates or sheets of glass, and wherein said sections, plates or sheets of glass are superimposed upon each other and have interposed between them plastic material in such manner that the superimposed strips or ribbons of plates or sections of prefabricated glass and the interposed plastic material are capable of movement as a unit through the surfacing apparatus, and although the unit will possess sufficient flexibility to adapt itself to small variations in the processing equipment it will, at the same time, be capable of resisting the forces created by the surfacing elements, thus eliminating breakage of the sheets, sections or plates of glass, as well as chipping of the edges of the same.

Another method which has been suggested for the manufacture of laminated glass is to interpose a ribbon of plastic or bonding material between two continuous ribbons or strips of glass drawn from the glass fabricating apparatus, and then subjecting the continuous strips of glass with the interposed strip or ribbon of plastic material to heat and pressure to effect a bond between the same.

Another important object of the present invention is to provide a method of manufacturing a strip or ribbon of laminated glass wherein prefabricated sheets, plates or sections of glass are employed in the formation of the strip or ribbon of laminated glass, thus providing a process of forming laminated glass which is completely separate from and independent of the process or equipment for initially fabricating the glass.

A further object is to provide a method of manufacturing a strip or ribbon of laminated glass, such as specified in the last named object, and wherein the resultant strip or ribbon of laminated glass will be of improved quality, since each prefabricated plate, section or sheet of glass used in the manufacture of the laminated ribbon can be inspected for defects and only those which are free from imperfections and suitable for producing a clear, laminated glass need be used.

Another object is to provide a method of manufacturing a strip or ribbon of laminated glass from prefabricated sheets, sections or plates of glass such that manufacturing costs can be substantially reduced, since the sheets, sections or plates of glass used can be carefully selected to employ only those free of imperfections and those which need to be ground and polished only on one side thereof.

A still further object of the invention is to provide a method of manufacturing a strip or ribbon of laminated glass from prefabricated plates or sections of glass and which is of such character that the resultant strip of laminated glass will have exactly parallel surfaces with a consequent minimization of any tendencies toward the distortion of light rays passing through the glass, as so often is the case now with laminated glass constructed by the conventional methods.

The objects hereinbefore set forth together with still further and more detailed objects and resulting advantages incident to the practice of the invention will become apparent hereinafter during the following detailed description of ways in which the invention can be carried out, such description to be read in connection with the accompanying drawings wherein, Fig. 1 is a fragmentary elevational view of a portion of a strip or ribbon of bonded and laminated glass embodying the invention and made in accordance with the method of the invention.

Figure 2 is a view similar to Fig. 1 but showing a strip or ribbon of bonded and laminated glass differing somewhat from that shown in Fig. 1.

Fig. 3 is a view similar to Figs. 1 and 2, but showing a still different form of bonded and laminated glass strip or ribbon.

Fig. 4 is a sectional view through the strip or ribbon shown in Fig. 3 and is taken substantially on line 4—4 looking in the direction of the arrows.

Fig. 5 is a longitudinal sectional view taken along line 5—5 of Fig. 3.

Fig. 6 is a view similar to Fig. 1 but shows the sheets, sections or plates of prefabricated glass arranged only on one side of the strip of plastic material.

Fig. 7 is a diagrammatic illustration of apparatus for forming the prefabricated sheets, plates or sections of glass and the strip of plastic material into a continuous strip or ribbon of laminated glass.

Fig. 8 is a diagrammatic illustration of apparatus for carrying out that phase of the method which includes the surfacing of the strip of laminated glass.

Fig. 9 is a side sectional view of a strip of laminated glass as made by a method embodying the invention but differing from those shown in the previous figures.

Fig. 10 is a view similar to Fig. 9 except that the superimposed plates or sections of glass are staggered so the edges thereof overlap, and Fig. 11 is a diagrammatic illustration of apparatus for making the laminated glass by a method embodying the invention but differing somewhat from those previously illustrated.

Referring to Fig. 1, there is disclosed a strip or ribbon of bonded and laminated glass and which comprises a strip or ribbon of bonding material 10 such as a suitable plastic material interposed between two series of aligned superimposed sections, sheets or plates of prefabricated glass 11 and 12, preferably of the same width as the strip or ribbon 10 of bonding material. The end edges of the plates or sections of prefabricated glass of each series are arranged in abutting relationship and preferably the plates or sections of prefabricated glass 11 are so arranged that their abutting end edges 11a are staggered longitudinally of the strip or ribbon with respect to the abutting end edges 12a of the plates or sections 12; that is the abutting end edges of the plates of the upper series overlap the abutting end edges of the plates or sections of the lower series. This arrangement of overlapping the abutting and adjacent edges of the plates or sections of one series with respect to the abutting edges of the plates or sections of the other series results, when the series of plates or sections of prefabricated glass are bonded together and to the strip or ribbon of plastic material, in providing a relatively strong and rigid composite structure that has the requisite rigidity and strength to resist the stresses occurring in the continuous strip or ribbon of laminated glass during the grinding and polishing operations. In addition the arrangement of having the abutting edges of one series overlapping the abutting edges of the other series results in each series of sheets or plates tending to support the other series adjacent to their abutting edges and thus reduces or eliminates relative movement between the plates or sections of each series at their abutting edges, thereby eliminating danger of chipping said edges during the grinding operation.

The strip or ribbon of laminated glass disclosed in Fig. 2 differs somewhat from that shown in Fig. 1 and in certain respects is not as preferabe as the form of construction shown in Fig. 1, while in other respects it is more preferable. In Fig. 2 the upper series is formed of prefabricated plates, sections or sheets of glass 13, the end edges of which sections or plates are in abutting relation, as indicated at 13a. The lower series of plates or sections of prefabricated glass have their end edges arranged in abutting relationship, as indicated at 14a, it being noted, however, that the abutting edges 13a of the upper series overlie or are opposite to the abutting edges 14a of the lower series as distinguished from the staggered or overlapping relationship referred to in connection with Fig. 1. The strip or ribbon of bonding or plastic material 10 is interposed between the upper and lower series of glass plates or sections in Fig. 2 in the same way as it is in Fig. 1.

The form shown in Fig. 2 would have certain advantages in that waste in the subsequent cutting operation after the strip has been finished could be reduced to a minimum but, on the other hand, this form of construction would not possess the advantages of strength and rigidity present in the construction shown in Fig. 1.

The strip or ribbon of laminated glass shown in Fig. 3 is wider than the strips or ribbon heretofore described. This strip comprises a relatively wide strip or ribbon of bonding material 15 interposed between upper and lower series of plates or sections of prefabricated glass. The upper series is formed of plates or sections of prefabricated glass 16 arranged side by side on the strip of material 15 with the adjacent side edges 16a of the plates or sections in abutting relationship as are also the adjacent end edges 16b thereof. The lower series is formed of plates or sections of prefabricated glass similarly arranged, with their adjacent side edges 17a and their adjacent end edges 17b in abutting relationship. In this form of construction it will be noted that the plates or sections of prefabricated glass 16 forming one side of the series are wider than the plates or sections forming the other side of the series, with a similar arrangement being followed in the lower series formed of the plates 17, except that the narrower plates or sections of the lower series underlie the wider plates or sections of the upper series and vice versa, as clearly indicated in Fig. 4.

It will be seen that the adjacent abutting side edges 16a of the plates or sections 16 of the upper series are staggered transversely of the strip or ribbon with respect to the abutting side edges 17a of the lower series. In other words, the side plates or sections of each series overlap the joints between the adjacent abutting side edges of the plates of the other series, thereby giving lateral strength and rigidity to the strip or ribbon.

As illustrated in Fig. 2, the adjacent abutting end edges 13a of the plates or sections 13 of the upper series overlie the adjacent abutting end edges 14a of the plates 14 of the lower series. However, Figs. 3 and 5 illustrate a construction wherein the adjacent abutting end edges 16b of the plates 16 of the upper series are staggered longitudinally of the strip or ribbon of laminated glass with respect to the adjacent abutting end edges 17b of the plates or sections 17 of the lower series in a manner similar to that explained with respect to the corresponding edges of the strip or ribbon of laminated glass illustrated in Fig. 1 and for the same purpose.

It will be seen that the strip or ribbon of laminated glass shown in Fig. 3 is so formed that both the adjacent abutting side edges and the adjacent abutting end edges of the plates or sections of the upper series overlap or are staggered with respect to the corresponding edges of the plates or sections of the lower series thus imparting to the strip or ribbon of laminated glass strength and rigidity against relative movement of the plates or sections of the series both transversely of the strip or ribbon as well as longitudinally thereof. Of course, if desired, the strip or ribbon of laminated glass shown in Fig. 3 could be formed with the adjacent abutting side and/or end edges of the plates or sections of the upper series overlying the corresponding edges of the plates or sections of the lower series.

In Fig. 6 there is shown a strip or ribbon of bonded or united prefabricated sections or plates of glass 18 mounted on one side of a strip or ribbon 19 of plastic or bonding material, with the end edges 18a of the plates or sections 18 arranged in abutting relationship.

Although ordinarily the strip or ribbon of bonding material, such as the strip 19, would be interposed between upper and lower series of plates or sections of prefabricated glass, there may be instances wherein it would be desirable to have only one series of prefabricated plates or sections of glass mounted on the strip or ribbon of plastic material and Fig. 6 is for the purpose of showing such an arrangement.

It will be understood that although Figs. 1 to 5 inclusive show strips or ribbons of two ply laminated glass, the present invention contemplates strips or ribbons of laminated glass of more than two plies and that such strips or ribbons would be formed in the same way, there being interposed between adjacent superimposed series of prefabricated glass plates or sections strips or ribbons of the bonding or plastic material.

As already stated, Fig. 7 is a diagrammatic illustration of apparatus for carrying out one form of the method contemplated by the present invention. Referring to Fig. 7, the strip of plastic bonding material is indicated at 20, while piles of the prefabricated glass sections or plates forming the upper and lower series of plates or sections of the laminated glass strip or ribbon are indicated at 21 and 22, respectively.

The invention in one of its aspects contemplates interposing a strip or ribbon of plastic or bonding material 20 automatically and continuously between the progressively assembled sections, sheets or plates of prefabricated glass 21 and and 22. The strip or ribbon 20 of plastic or bonding material is preferably drawn from a roll of such material indicated at 23 and passes around an idling roll 24 acting as an escapement by which a suitable length of the ribbon of plastic material can be released when the roll 23 is about to be exhausted to permit the union of the strip or ribbon of plastic material with the end of a reserve roll 25 of such material without interrupting the continuous operation of the process. The strip or ribbon 20 of plastic material passes between rotating feed rolls 26 and then into and through a chamber 27, being assisted in passing through the chamber by rotating feed rolls 28 located adjacent to the opposite end of the chamber 27 from the rolls 26.

The chemical nature of the plastic or bonding material is probably such that it is preferable to wash and brush the surfaces of the ribbon of the material so that its adherent properties will be most efficient, and this is accomplished by subjecting the material to a washing and brushing operation. The washing operation may be accomplished by means of a plurality of opposed sprays of water 29, while the brushing operations are accomplished by means of a plurality of opposed brushes 30, all these operations taking place within the chamber 27 as the continuously moving ribbon or strip of plastic material passes therethrough.

The continuously moving strip or ribbon of plastic material 20 after it leaves the feed rollers 28 is directed toward the assembly table over a guide roller 31 and passes downwardly between another pair of feed rollers 32 and around a second guide roller 33, from whence it extends in a horizontal direction. At the assembly table the prefabricated sheets or plates 21 of glass forming the upper series are applied to the upper side of the now horizontally moving strip or ribbon of bonding material, with the adjacent end edges of the plates or sections 21 in abutting relationship. The plates or sections 22 of prefabricated glass which form the lower series are progressively fed forwardly by propulsion rollers 34 beneath the moving strip 20 with the adjacent end edges of the plates or sections 22 in abutting relationship.

It will be understood that the apparatus for feeding the plates or sections of prefabricated glass 21 and the plates or sections of prefabricated glass 22 to form the upper and lower series of the laminated strip or ribbon can be of such character and so regulated that the abutting edges of the plates or sections of the one series will register with or overlie the abutting edges of the plates or sections of the other series, or it can be so regulated that said edges will be arranged in overlapping or staggered relationship depending upon the form desired in the finished strip or ribbon of laminated glass.

It will thus be observed that the sections or plates of prefabricated glass forming both the upper and lower series are progressively fed or assembled into cooperating relationship with the continuously moving strip or ribbon of plastic material.

The assembled upper and lower series of plates or sections of prefabricated glass with the interposed continuously moving strip or ribbon of plastic material now pass between a series of propulsion rolls 35 to assist in the constant forward movement of the loosely assembled or constructed strip or ribbon of laminated glass. The assembled strip or ribbon of laminated glass is now subjected to pressure, and preferably to gradually increasing pressure, so that the inner surfaces of the upper and lower series of prefabricated glass plates or sections are pressed against the interposed continuously moving strip or ribbon of prepared plastic or bonding material to insure a complete contact of the plastic material over the entire inner surfaces of the plates or sections of prefabricated glass forming the upper and lower series. This pressure may be obtained by means of a plurality or series of compression rolls 36 spaced longitudinally of the moving strip or ribbon and subject to pressure forces indicated by the triangles 37 and gradually increasing in amounts in the direction of movement of the continuous strip or ribbon.

It is proposed to use all the apparatus for carrying out the steps of the process thus far described in an atmospherically controlled chamber shown by dot and dash lines in Fig. 7 and indicated by the numeral 38. This will probably be advisable due to the chemical and physical characteristics of the now available plastic material suitable for use in bonding the superimposed layers of glass.

The continuously moving strip or ribbon of laminated glass after leaving the pressure rolls 36 passes between feed rollers 39 and thence into a curing or plasticizing chamber 40, wherein the continuously moving strip or ribbon of laminated glass is subjected to relatively high temperature and relatively high pressures, the latter being applied by way of illustration by means of pressure rollers 41 subjected to pressure forces as represented by the triangles 42. The high temperature to which the continuously moving strip or ribbon of laminated glass is subjected can be derived by any of a variety of means for introducing heat into the chamber 40. The subjecting of the continuously moving strip or ribbon of laminated glass to the predetermined relatively high temperature and to the relatively high pressures effectively unites the plies of glass and the plastic material into a bonded and integral laminated structure.

It will be understood that other methods may be employed for applying the necessary relatively high pressures and temperatures to the moving laminated strip or ribbon of glass other than that just referred to as, for example, by heated resilient pressure rolls or by a continuous autoclave method in which pressure fluid is confined and heated to the desired temperature or by any other suitable and desirable method.

When the strip or ribbon of laminated glass has moved through the curing or plasticizing chamber 40 it passes between the rollers 43 of a conveyer table, as indicated in Figs. 7 and 8, after which it passes through the surfacing and cutting operations now to be described.

As shown in Fig. 8, the surfacing operations may form part of one continuous process of constructing the strip or ribbon of laminated glass and such surfacing operations include grinding and polishing simultaneously the upper and lower surfaces of the continuously moving strip or ribbon of laminated glass. The moving strip or ribbon of laminated glass passes between a series of suitable opposed grinders 44 and suitable opposed polishing members 45, there being three sets of opposed grinders 44 and three sets of opposed polishing members 45 illustrated in Fig. 8. In order to carry on the forward movement of the strip or ribbon of laminated glass propulsion rollers 46 are interposed between the opposed sets of grinders and between the opposed polishing members 45.

As already explained, the abutting edges of the prefabricated glass plates or sections forming the upper and lower series of the laminated strip or ribbon are so arranged that preferably the corresponding abutting edges of the upper series of plates or sections are staggered or overlap with respect to the abutting edges of the lower series of plates or sections, wherefore rigidity is imparted to the laminated strip or ribbon to resist the forces set up by the grinders and by the polishing members which thus reduce the likelihood of breakage, although the strip will have sufficient flexibility to adapt itself to slight irregularities or variations to which it may be subjected in passing between the grinders and the polishing members to thus reduce the danger of chipping the edges of the plates or sections of prefabricated glass forming the upper and lower series of the strip or ribbon. After the strip or ribbon of laminated glass has passed through the grinders and the polishing members and has thus been surfaced, it is drawn by propulsion rollers 47 onto a cutting table 48 where it can be severed into suitable and desired lengths or shapes.

In Fig. 9 there is illustrated a laminated glass strip also constructed in accordance with the invention and wherein the method of forming the strip differs somewhat from the method or process previously described. In this form of the invention a sheet of plastic or bonding material 49 is interposed between an upper plate or section of prefabricated glass 50 and a lower plate or section of prefabricated glass 51. A series of the laminated units formed of the superimposed plates or sections 50 and 51 with the interposed plastic material 49 are arranged in alignment with the end edges of the plates or sections 50 and 51 in substantially abutting relationship, and then plastic material 52 in a semi-fluid or emulsified condition is introduced between the substantially abutting adjacent end edges of the plates or sections 50 and 51. After the plastic material 52 has been introduced between the adjacent end edges of the plates or sections, pressure and heat is applied to the strip as heretofore explained not only to unite the plates or sections to the plastic material 49 but also to unite and bond together the adjacent end edges of the plates or sections and the plastic material 52. The plastic material 52 may be introduced between the adjacent end edges of the plates or sections of prefabricated glass from a suitable hopper such as indicated at 53 or by some other suitable means. It will be understood that the strip or ribbon of laminated glass can be surfaced or finished by grinding and polishing operations as previously explained.

Fig. 10 is similar to Fig. 9 except that the plates or sections 50a and 51a of prefabricated glass are so dimensioned and arranged that the adjacent end edges of the plates or sections of the upper series overlap or are staggered with respect to the adjacent end edges of the plates or sections of the lower series, it being noted, however, that the plastic material 52 is introduced between the adjacent end edges of the plates or sections of both the upper and lower series of plates or sections.

In Fig. 11 there is illustrated diagrammatically apparatus for carrying out a still different form of method or process embodying the invention and wherein semi-fluid or emulsified plastic or bonding material is sandwiched between the superimposed plates or sections of prefabricated glass as distinguished from interposing therebetween a preformed strip or ribbon of plastic or bonding material, as was done in the previously described methods. Also in this form of the method semi-fluid plastic or bonding material is introduced between the substantially abutting edges of the separate sheets or plates of prefabricated glass forming the upper and lower series or plies of the laminated glass.

Referring to Fig. 11, 54 indicates a pile or stack of prefabricated glass plates or sections 55 which will constitute the lower series of plates or sections of the laminated glass strip. The lowermost plate or section 55 of the pile 54 is fed by suitable mechanism including a series of propulsion rolls 56 and 57 progressively across a supporting or backing platform 58. The plates or sections 55 are so fed and moved along that their adjacent end edges are slightly apart as the plates or sections pass across the platform 58, wherefore semi-fluid or emulsified plastic or bonding material 59 can be introduced between said adjacent edges in a suitable amount from a hopper 60. The plates or sections 55 with the semi-fluid or emulsified plastic material 59 between the adjacent end edges thereof are moved forward by a series of propulsion rolls 61 and beneath a hopper 62 that is filled with semi-fluid or emulsified plastic or bonding material 63. The hopper 62 is of such width and so constructed that a layer or film of the plastic material 63 will be continuously and evenly deposited upon the entire upper surface of the moving plates or sections 55. After the plates or sections have had the layer or film of the plastic material 63 deposited thereon they are moved by a series of propulsion rolls 64 beneath a pile or stack 65 of similar plates or sections of prefabricated glass 66 and which are to form the upper series of glass plates or sections of the laminated glass strip. The plates or sections 66 are progressively fed from the stack 65 upon the film or layer of plastic material 63 on the continuously moving series of plates or sections 55, and preferably the plates or sections 66 are so assembled on the plates or sections 55 that the adjacent end edges of the former will be staggered or overlap the adjacent end edges of the latter. The superimposed series of glass plates or sections 55 and 66, with the plastic material 63 therebetween, are now continuously moved forward by propulsion rolls 67 and pass beneath a hopper 68 also filled with the semi-fluid or emulsified plastic or bonding material 59 which is fed from the hopper 68 into the space between the adjacent end edges of the plates or sections 66.

The ribbon or strip of laminated glass, formed of the plates or sections 55 and 66 with the plastic material 63 interposed therebetween and with the plastic material 59 between the adjacent substantially abutting end edges thereof, then moves forward by means of propulsion rolls 69 and passes between friction rolls 70 which gradually slow up the forward movement of the strip or ribbon of laminated glass and create longitudinal pressure on the plates or sections or both the upper and lower series to bring the adjacent edges of the plates or sections tightly together and into close abutting relationship so that the plastic material 59 will bond said edges together. After this has taken place, the continuous strip or ribbon of laminated glass is progressively and continuously moved forward and subjected to pressure and heat and to finishing operations in the same manner as in the method and apparatus illustrated in Figs. 7 and 8.

As previously stated the strips or ribbons of laminated glass after they have been formed by heat and pressure into structural units having stability may be immediately surfaced or they may be sold and shipped to a purchaser or user without surfacing operations having been performed thereon, since said operations can be subsequently performed by said purchaser or user.

From the foregoing description it will have been seen that the invention embodies an improved method of economically constructing and assembling prefabricated sheets, sections or plates of glass into a strip or ribbon of laminated glass that can be economically processed or otherwise surfaced to produce a high quality finished product. It will also be observed that the strip or ribbon of laminated glass being formed from prefabricated glass sheets, sections or plates is constructed separate from and independently of the glass fabricating process and the equipment used therein and enables only perfect glass to be used in the formation of the strip or ribbon of laminated glass. In addition, as already pointed out, the prefabricated plates or sections forming the upper and lower series are so arranged that their abutting edges have a predetermined relationship with respect to each other of a character that imparts rigidity and strength to the ribbon or strip of laminated glass without destroying the flexibility thereof, wherefore such strip or ribbon can be subjected to grinding and polishing or other surfacing operations as part of the process of manufacture.

It will also be seen that by continuously and simultaneously grinding or surfacing both outside faces or surfaces of the continuous strip of laminated glass, perfectly parallel surfaces will result and that this is a most desirable condition since it insures uniform refraction of light rays throughout the entire area of the glass.

The expression "strip or ribbon" as used in the specification and claims hereof means an elongated strip or ribbon of glass the surfaces of which are substantially uninterrupted and which can be surfaced as a structural unit by means of surfacing operation, and is of such length that it can be severed into a plurality of lengths of glass suitable for installations in automobile windshields, windows or other similar environments. Although several preferred forms of the completed article embodying the invention, as well as different forms of apparatus for carrying out the process in various ways, have been illustrated herein, it will be understood that various other forms and arrangements may be employed within the scope of the appended claims.

Having thus described my invention I claim:

1. A strip of laminated transparent material comprising a series of aligned separate glass plates with the adjacent end edges thereof arranged in substantially abutting relationship, and a unitary layer of plastic material covering one surface of the entire series of glass plates, said plastic material and said glass plates being united into a stable unitary structure.

2. A strip of laminated glass comprising superimposed series of aligned separate glass plates arranged with the adjacent edges of the plates of each series in substantially abutting relationship, and a unitary layer of bonding material interposed between the entire adjacent surfaces of said superimposed series of glass plates, said series of glass plates and said bonding material being united into a stable unitary structure.

3. A strip of laminated glass comprising superimposed series of separate glass plates, the adjacent edges of the plates of each series being arranged in substantially abutting relationship, with the adjacent edges of one series staggered with respect to the corresponding adjacent edges of the other series, and a layer of bonding material interposed between the adjacent surfaces of the superimposed series of glass plates, said plates and said bonding material being united into a stable unitary structure.

4. A strip of laminated glass comprising a unitary layer of bonding material, a series of aligned separate glass plates arranged on each side of said layer of bonding material, the adjacent edges of the glass plates on each side of said layer of bonding material being in substantially abutting relationship, said glass plates and said layer of bonding material being bonded into a stable unitary structure.

5. A strip of laminated glass comprising a layer of bonding material, a plurality of series of aligned separate glass plates arranged on each side of said material, the adjacent edges of said glass plates on each side of said material being in substantially abutting relationship with certain of said adjacent edges of the plates on one side of said material staggered with respect to the corresponding adjacent edges of the plates on the other side of said material, said plates and said material being bonded into a stable unitary structure.

6. A method of manufacturing a strip of laminated glass which comprises applying to both surfaces of a unitary layer of bonding material a series of separate glass plates so as to have their adjacent edges in substantially abutting relationship, subjecting the assembled glass plates and material to heat and pressure to unite the same into a stable unitary structure, and then surfacing the exposed surfaces of the united structure by means of surfacing operations to render the same parallel.

7. A method of manufacturing a strip of laminated glass which comprises applying to both sides of a layer of bonding material a series of separate glass plates so as to have their adjacent edges in substantially abutting relationship and with certain of the adjacent edges of the plates on one side of said material staggered with respect to the corresponding adjacent edges of the plates on the other side of said material, subjecting the assembled glass plates and bonding material to heat and pressure to unite the same into a stable unitary structure, and then surfacing the exposed surfaces of the united structure by means of surfacing operations to render the same parallel.

8. A method of manufacturing a strip of laminated glass which comprises continuously moving a unitary strip of plastic material, progressively applying to both sides of said moving strip of material separate glass plates so arranged as to have their adjacent edges in substantially abutting relationship, subjecting the continuously moving assembled glass plates and strip of material to pressure and heat to bond the same into a stable unitary structure, and then surfacing the exposed surfaces of the united structure by means of surfacing operations to render said surfaces parallel.

JOHN C. CROWLEY.